US012132843B2

(12) United States Patent
Lamm

(10) Patent No.: US 12,132,843 B2
(45) Date of Patent: Oct. 29, 2024

(54) SYSTEM AND METHOD FOR SECURE DEVICE AUTHENTICATION VIA SEQUENTIAL SIGNED CERTIFICATES

(71) Applicant: Benjamin Lamm, Toms River, NJ (US)

(72) Inventor: Benjamin Lamm, Toms River, NJ (US)

( * ) Notice: Subject to any disclaimer, the term of this patent is extended or adjusted under 35 U.S.C. 154(b) by 171 days.

(21) Appl. No.: 17/688,045

(22) Filed: Mar. 7, 2022

(65) Prior Publication Data
US 2023/0283485 A1     Sep. 7, 2023

(51) Int. Cl.
    *H04L 9/32* (2006.01)
(52) U.S. Cl.
    CPC .......... *H04L 9/3265* (2013.01); *H04L 9/3247* (2013.01); *H04L 9/3268* (2013.01)
(58) Field of Classification Search
    CPC .... H04L 9/3265; H04L 9/3247; H04L 9/3268
    See application file for complete search history.

(56) References Cited

U.S. PATENT DOCUMENTS

| | | | | |
|---|---|---|---|---|
| 6,134,550 A * | 10/2000 | Van Oorschot | .. | G06Q 20/38215 |
| | | | | 707/999.009 |
| 10,728,044 B1 * | 7/2020 | Melo | ...................... | H04L 9/0825 |
| 2010/0100731 A1 * | 4/2010 | Mok | ...................... | H04L 9/3265 |
| | | | | 713/157 |
| 2010/0185849 A1 * | 7/2010 | Rune | ...................... | H04L 9/3265 |
| | | | | 713/156 |
| 2021/0374693 A1 * | 12/2021 | La Salle | ............ | G06Q 20/0655 |
| 2022/0060341 A1 * | 2/2022 | Ounsworth | ............. | H04L 9/007 |

OTHER PUBLICATIONS

"Web of trust", retrieved from the internet: https://en.wikipedia.org/wiki/Web_of_trust#Public_key_authenticity_check (accessed Mar. 3, 2022).
"Gossamer Spider Web of Trust, An Innovative and Progressive OpenPGP Web of Trust", retrieved from the internet: http://www.gswot.org/ (accessed on Mar. 3, 2022).
"Thawte", retrieved from the internet: https://en.wikipedia.org/wiki/Thawte#Web_of_Trust (accessed on Mar. 3, 2022).

* cited by examiner

*Primary Examiner* — Viet D Vu

(57) ABSTRACT

A method of operation of a first device storing a first private key and a first public key corresponding to the first private key includes receiving, from a second device, an unsigned certificate including a second public key and second identification information associated with the second public key. The method further includes sending, to a server, a signed certificate corresponding to a signed version of the unsigned certificate. The method further includes receiving, from a third device, a third public key and third identification information associated with the third public key, and based on a request for authentication associated with the third identification information, receiving, from the server, a response that indicates whether the server identifies, within a database, a sequence of signed certificates from the first public key to the third public key.

19 Claims, 3 Drawing Sheets

SYSTEM AND METHOD FOR SECURE DEVICE AUTHENTICATION VIA SEQUENTIAL SIGNED CERTIFICATES

TECHNICAL FIELD

Aspects of the disclosure relate generally to electronic devices and more particularly to authentication of electronic devices using public key encryption.

INTRODUCTION

Electronic devices increasingly provide a wide variety of functions. For example, electronic devices may be used to send and receive messages (such as texts and emails), to store and retrieve data, to control vehicles or machinery, to monitor other devices or events (such as in connection with a sensor network), and to perform numerous other functions.

In addition, electronic devices are increasingly connected with one another via communication networks. Communication networks include wired communication networks (such as Ethernet communication networks) as well as wireless communication networks (such as cellular communication networks). Electronic devices connected with one another via one or more communication networks may communicate messages, data, and information with one another via the one or more communication networks. For example, electronic devices connected to the Internet may use the Internet to communicate messages, data, and information with one another.

As more electronic devices are connected to the Internet and to other communication networks, information verification (such as verification of information that identifies a source of a communication) is increasingly important and difficult. For example, a malicious actor may present a credential or attribute of a different device, person, or other entity (such as by "spoofing" a phone number) in order to gain access to a computer system, to subscribe to a service, to join a teleconference, or to join a network. In some circumstances, verifying whether a message or request is legitimate (or whether the message or request originated from a malicious actor) may be difficult.

Some conventional techniques for information verification may use ancillary markers (or "fingerprints") to estimate a likelihood that a message or request is legitimate, such as by accessing various attributes associated with the message or request. As an example, a source identifier (such as an Internet Protocol (IP) address) of a source of a message may be used to determine the likelihood that the source of the message is legitimate. As another example, text of the message may be compared to text received from known malicious actors. Such conventional techniques may involve enabling a third party service to access personal or confidential information, such as emails, which may be inefficient or infeasible in some cases. Further, in some cases, the third party service may be unable to reach a reliable decision regarding the legitimacy of a message or request, such as where some markers indicate legitimacy and other markers indicate illegitimacy. In addition, such third party services may be associated with latency (e.g., time spent parsing emails to identify ancillary markers) and may be expensive in some cases.

BRIEF SUMMARY OF SOME EXAMPLES

A verification system in accordance with some aspects of the disclosure may create a network in which verification is performed using sequences of signed certificates. To illustrate, the verification system may include multiple devices each storing a respective public key and private key. A first device may use the private key of the first device to sign a certificate associated with another device, such as a second device. The certificate may include a public key and identification information associated with the public key. For example, the identification information may indicate a person or party that is claiming ownership of the public key. By signing the certificate, the first device may indicate (or certify) that the identification information is correct. Signed certificates may be stored at a database that is accessible to the devices.

In some circumstances, the first device may use the database to authenticate information (such as personal information) provided by a requesting device, such as a third device. For example, the third device may provide a public key and identification information associated with the public key to the first device. To determine whether the information is accurate (or whether the identification information is "spoofed"), the first device may initiate a request to a server to access the database.

Based on the request, the server may access the database to determine whether the database includes a sequence of signed certificates from the public key associated with the first device to the public key associated with the third device. Each signed certificate in the sequence may include a digital signature of the first device or of a device associated with a preceding certificate in the sequence. To illustrate, in one example, the certificate of the third device may be signed by another device, such as the second device, whose certificate is signed by the first device. In such an example, the sequence of signed certificates may include two signed certificates. To further illustrate, in such an example, the sequence may include a certificate of the second device that is signed by the first device using the private key of the first device, and may further include a certificate of the third device that is signed by the second device using the private key of the second device. In other examples, the sequence may include another number of signed certificates.

Upon identifying the sequence, the server may provide the sequence of signed certificates to the first device. The first device may use the sequence of signed certificates to verify that a chain of signatures exists between the first device and the third device. For example, the first device may use public keys associated with the sequence of signed certificates to verify that each certificate in the sequence of signed certificates is digitally signed by a private key that is associated with the first device or the preceding certificate in the sequence of signed certificates. As an illustrative example, the first device may use its own public key to decrypt the signature it provided for the second device (e.g., to verify a digital signature of the first device that is included the certificate of the second device), and may use the public key of the second device to decrypt the signature of the second device (e.g., to verify a digital signature of the second device that is included in the certificate of the third device). In some implementations, the first device stores (e.g., in a contact list) the unsigned certificates at the time that it signs them. In this case, the first device stores the public key of the second device and uses the local copy of the public key of the second device to decrypt the signature of the second device (e.g., to verify a digital signature of the second device that is included in the certificate of the third device).

By storing signed certificates at the server and providing, to the first device, a sequence of signed certificates from one public key to another public key, the first device may independently verify the third device using public keys of the sequence of signed certificates. As a result, reliance on a third party to assess ancillary markers may be reduced or avoided, resulting in a "trustless" (or reduced trust) verification system (e.g., where the first device may cryptographically verify the sequence of signed certificates instead of relying on a third party service to assess ancillary markers associated with the third device). Further, in some cases, the verification system may reduce or avoid third party access to personal or confidential information. In addition, in some cases, the verification system may improve verification accuracy as compared to some third party services (such as in cases where some markers indicate legitimacy and other markers indicate illegitimacy) and may reduce cost and latency (e.g., by avoiding parsing of emails to identify ancillary markers) that may be associated with third party services.

BRIEF DESCRIPTION OF THE DRAWINGS

A further understanding of the nature and advantages of the present disclosure may be realized by reference to the following drawings. In the drawings, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
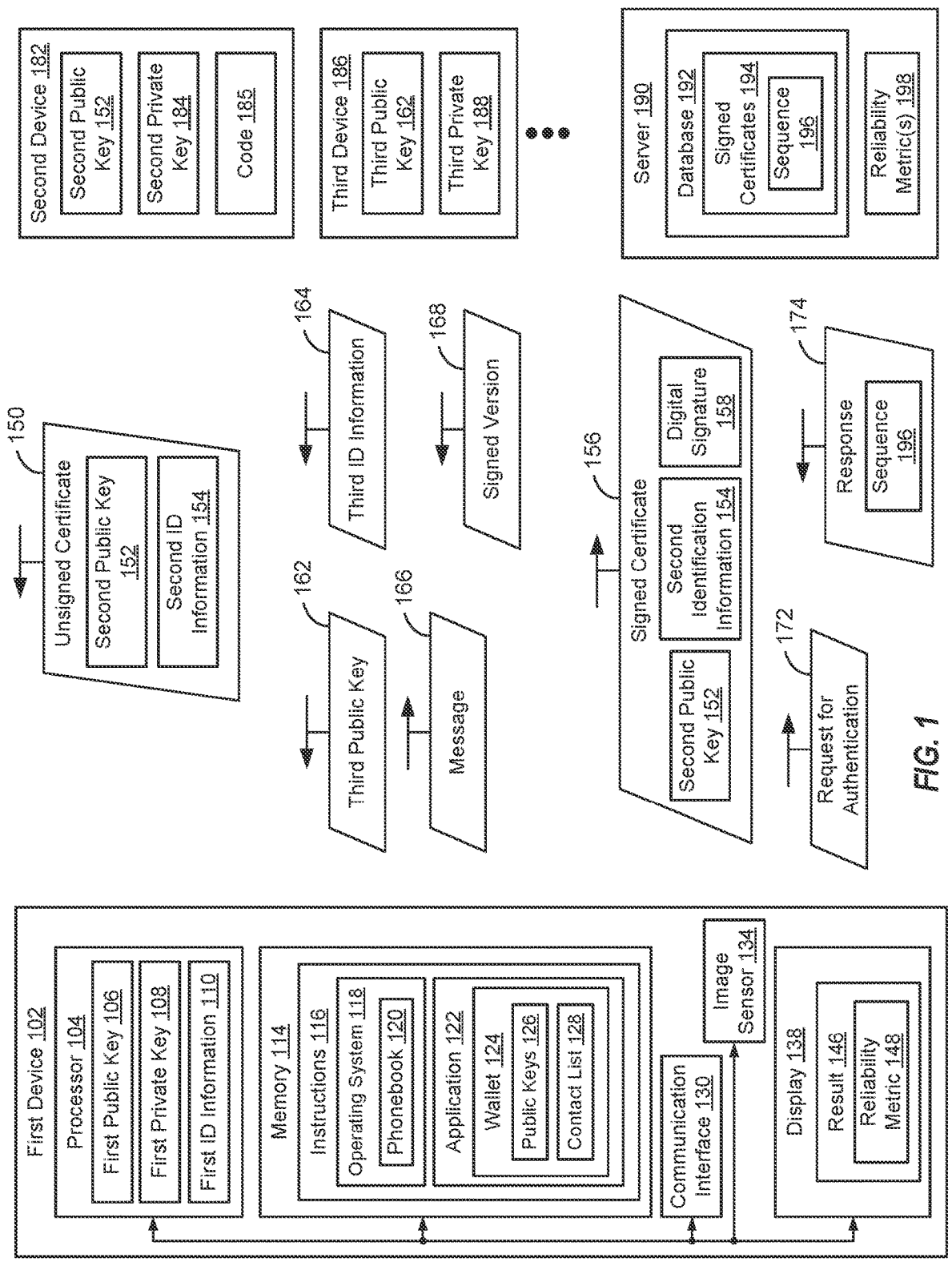
FIG. 1 is a block diagram of an illustrative example of a system according to some aspects of the disclosure.

FIG. 1 is a diagram of an illustrative example of a system 100 according to some aspects of the disclosure. The system 100 may include a first device 102, a second device 182, a third device 186, and a server 190. It is noted that the number of devices illustrated in FIG. 1 is illustrative and that other examples are also within the scope of the disclosure.

In some examples, the devices 102, 182, and 186 may each include a computing device, such as a phone (e.g., a mobile phone or smartphone), a computer (e.g., a desktop computer, a server, a laptop computer, a notebook computer, or a tablet computer), a gaming device, a wearable computing device (such as a smart watch or a fitness tracker device), a vehicle device or subsystem, a medical device (such as a surgically implantable medical device), or another type of device, as illustrative examples. Further, although the server 190 may be described as a single server or device, in some examples, features of the server 190 may be implemented using one or more computing devices that are operable as a server, such as where the server 190 includes or corresponds to multiple devices connected via a mesh network, cloud infrastructure, or other communication network.

The first device 102 may include one or more processors, hereinafter referred to as a processor 104. The first device 102 may further include a memory 114, a communication interface 130, an image sensor 134, and a display 138. Any of the processor 104, the memory 114, the communication interface 130, the image sensor 134, and the display 138 may be coupled to one or more other components of the first device 102 via one or more buses or other communication structures. In an example, the processor 104 is coupled to the memory 114, the communication interface 130, the image sensor 134, and the display 138 via the one or more buses or other communication structures. The processor 104 may provide data, commands, and other signals to, and may receive data, commands, and other signals from, the memory 114, the communication interface 130, the image sensor 134, and the display 138 via the one or more buses or other communication structures.

The memory 114 may include one or more volatile memories, one or more non-volatile memories, or a combination thereof. The memory 114 may store instructions 116 that are accessible to the processor 104. The processor 104 may execute the instructions 116 to initiate, perform, or control one or more operations described herein. To further illustrate, in some examples, the instructions 116 may include an operating system 118 of the first device 102.

In some examples, the communication interface 130 may include or correspond to a wireless communication interface, such as one or more of a cellular communication interface, a wireless communication interface that communicates based on a Wi-Fi communication protocol (Wi-Fi is a trademark of the Wi-Fi Alliance of Austin, Texas), or a wireless communication interface that communicates based on a Bluetooth communication protocol (Bluetooth is a trademark of the Bluetooth Special Interest Group (Bluetooth SIG) of Kirkland, Washington). Alternatively or in addition, the communication interface 130 may include a wired communication interface, such as an Ethernet communication interface, as an illustrative example. The communication interface 130 may communicate using one or more communication networks, such as a one or more of a local area network (LAN), a wireless LAN (WLAN), a wide area network (WAN), a personal area network (PAN), a wireless personal area network (WPAN), or a cellular network, as illustrative examples.

In some implementations, the image sensor 134 includes one or more cameras, such as a complementary metal-oxide-semiconductor (CMOS) camera or a charge-coupled device (CCD) camera. Alternatively or in addition, the image sensor 134 may include another type of imaging device, such as an ultrasound imaging device, as an illustrative example.

The display 138 may generate an output, such as a graphical user interface (GUI). In some examples, the display 138 includes or corresponds to a touchscreen device that receives user input via user interaction with the GUI (such as via a fingertip or stylus).

In addition, each of the second device 182, the third device 186, and the server 190 may include one or more components described with reference to the first device 102, one or more other components, or a combination thereof. For example, the second device 182 may include a second processor corresponding to the processor 104, a second memory corresponding to the memory 114, a third communication interface corresponding to the communication interface 130, a second image sensor corresponding to the image sensor 134, and a second display corresponding to the display 138. As another example, the third device 186 may include a third processor corresponding to the processor 104, a third memory corresponding to the memory 114, a third communication interface corresponding to the communication interface 130, a third image sensor corresponding to the image sensor 134, and a third display corresponding to the display 138. As an additional example, the server 190 may include a fourth processor corresponding to the processor 104, a fourth memory corresponding to the memory 114, and a fourth communication interface corresponding to the communication interface 130.

During operation, the first device 102 may generate a first public key 106 and a first private key 108. For example, the first device 102 may perform a key generating process that includes generating the first public key 106 and the first private key 108. The first public key 106 corresponds to the first private key 108. For example, the first public key 106 and the first private key 108 may correspond to a cryptographic key pair. The first public key 106 may be associated with first identification information 110. For example, the first identification information 110 may include information identifying a user or other party that owns the first public key 106, such as one or more of a personal name, business name, phone number, geographic address, website, social media identifier, or other information associated with the user or other party.

To further illustrate, in some examples, one or more devices described herein may execute an application 122 that initiates, controls, or performs operations described herein, such as generation of the first public key 106 and the first private key 108. In some examples, the application 122 may be downloaded by the first device 102 from an application database (such as "app store" or "app marketplace") as a standalone app. In some other examples, one or more features of the application 122 may be included within another application (such as if the one or more features of the application 122 are included in a "plugin" to another application, such as in a plugin to a web browser or other application). In some other examples, the application 122 may be included within or specified by the operating system 118 (e.g., where the application 122 is "native" to the operating system 118, such as if features of the application 122 are included within or specified by a phonebook 120 of the operating system 118).

The first device 102 may receive one or more unsigned certificates from one or other devices in connection with requests from the one or more other devices to sign the one or more unsigned certificates (e.g., to indicate knowledge of the one or more other devices). To illustrate, a first user of the first device 102 may know a second user of the second device 182 (e.g., where the first user and the second user have a personal, business, employer-employee, or other relation). To further illustrate, in some examples, the second user may be indicated by the phonebook 120 of the first device 102.

The second device 182 may provide, to the first device 102, an unsigned certificate 150 (e.g., to prompt the first device 102 to sign the unsigned certificate 150). The unsigned certificate 150 may include a second public key 152 (which may be associated with a second private key 184) and may further include second identification information 154 associated with the second public key 152. For example, the unsigned certificate 150 may include information identifying the second user and indicating the second user owns the second public key 152. To further illustrate, the second identification information 154 may include one or more of a personal name, business name, phone number, geographic address, website, social media identifier, or other information.

In some examples, receiving the unsigned certificate includes capturing an image (e.g., using the image sensor 134) of one or more codes displayed by the second device 182, such as a code 185. The code 185 may represent the unsigned certificate 150. For example, the code 185 may include a first quick response (QR) code that represents the unsigned certificate 150 using a graphical format. Displaying the code 185 may enable the first device 102 to scan the code 185 (e.g., via the image sensor 134) to receive the unsigned certificate 150.

In some implementations, the first device 102 may generate a prompt requesting input verifying the second identification information 154 and may receive user input based on the prompt. To illustrate, the prompt may be included in an email, text message, or notification associated with the application 122. The prompt may be presented via the display 138. The prompt may indicate the second identification information 154 and may ask to confirm whether the second identification information 154 is correct. As a non-limiting example, if the second identification information 154 includes the name ("X") of a user of the second device 182, the prompt may ask, "Do you confirm that this person is X?" In some implementations, the prompt may indicate whether at least some of the second identification information 154 is included in a contact entry of the phonebook 120. The first device 102 may receive user input (e.g., via clicking on a link or pressing a button that may be presented via the display 138) indicating whether the second identification information 154 is verified.

Based on the user input indicating verification of the second identification information 154, the first device 102 may generate a public key digital signature 158 of the unsigned certificate 150 using the first private key 108. The first device may then produce a signed certificate 156 corresponding to a signed version of the unsigned certificate 150. For example, the signed certificate 156 may include the second public key 152, the second identification information 154, and the digital signature 158.

The signed certificate 156 may be transmitted to the server 190 for storage at a database 192 of signed certificates 194. For example, in some implementations, the first device 102 may transmit the signed certificate 156 to the server 190 for storage at the database 192 (e.g., where the application 122 initiates transmission of the signed certificate 156 from the first device 102 to the server 190). Alternatively or in addition, in some implementations, another device may transmit (e.g., relay or forward) the signed certificate 156 to the server 190 on behalf of the first device 102. To illustrate, in some examples, the first device 102 may lack a connection to the server 190 (such as if the first device 102 lacks Internet connectivity, or if the first device 102 is experiencing a service disruption associated with the connection to the server 190). In such examples, the first device 102 may provide the signed certificate to another device, such as the second device 182. In some such examples, after receiving the signed certificate 156 from the first device 102, the second device 182 may transmit the signed certificate 156 to the server 190 for storage at the database 192 (e.g., where the second device 182 also executes the application 122, and where the application 122 initiates transmission of the signed certificate 156 to the server 190).

In some implementations, the first device 102 may store information associated with one or both of the unsigned certificate 150 or the signed certificate 156 to a contact list 128 (which may be associated with the application 122) based on verification of the second identification information 154. For example, the first device 102 may store either the second public key 152 and the second identification information 154, or an indication of the second public key 152 and an indication of the second identification information 154, to contact list 128. To further illustrate, a wallet 124 may store public keys 126 associated with certificates signed by the first device 102. The public keys 126 may include the second public key 152.

In some implementations, the application 122 may use a hashed data structure in connection with identification information, such as the second identification information 154. To illustrate, the hashed data structure may include or correspond to a Merkle tree data structure in which at least some parameters indicated by the second identification information 154 are each associated with a different node of the Merkle tree data structure. As an illustrative example, the first device 102 may perform a hash of a first parameter (e.g., a first name) indicated by the second identification information 154 to generate a first hash value and may perform a hash of a second parameter (e.g., a last name) indicated by the second identification information 154 to generate a second hash value. The first device 102 may perform a hash of the first hash value and the second hash value to generate a third hash value. The first device 102 may then generate a public key digital signature of the second public key 152 and the third hash value (i.e. the root node of the merkle tree). At a later time, if the second device 182 is to prove its identity, the second device 182 may provide the third hash value (i.e. the root node) and, optionally, one or more additional nodes of the merkle tree. This may enable the second device to provide less than the full second identification information 154 to a third party at a time that the second device 182 is to prove its identity, significantly improving privacy concerns.

In some examples, the wallet 124 is stored locally at the first device 102. In some implementations, another type of wallet may be used in addition to the wallet 124, such as where a user of the first device 102 has access to multiple wallets associated with the application 122. For example, a proxy wallet may be stored remotely to the first device 102 (e.g., at a cloud server or other device) and may correspond to a read-only extension of a local wallet stored at the first device 102 (e.g., the wallet 124). At least some features of the proxy wallet may be updated based on (or synchronized with) the local wallet.

To illustrate, in some implementations, the proxy wallet is not added to the database 192 as a new node. A tag may be added to the wallet 124 indicating that the proxy wallet is a proxy of the wallet 124. The proxy wallet may retrieve (e.g., from the server 190) connections or contacts associated with the wallet 124 (e.g., to synchronize with the wallet 124). If the server 190 receives a request to identify a path between the proxy wallet and another wallet, the server 190 may search for a path between the wallet 124 and the other wallet. In some examples, the proxy wallet may be disenabled from signing an unsigned certificate. In such examples, the server 190 may reject a request from the proxy wallet to sign an unsigned certificate.

As a result, a user of the first device 102 may be able to use different devices (other than the first device 102) while still retaining access to the wallet 124 via the proxy wallet.

In some circumstances, the first device 102 may attempt to authenticate a third device 186. For example, the third device 186 may initiate an operation in which the first user of the first device attempts to authenticate the identity of a third user of the third device 186. For example, the operation may include or correspond to a request for the first device 102 to initiate or perform a transfer of data or a file to the third device 186. As another example, the operation may include or correspond to a request for the first device 102 to enable the third device 186 to access to a computer system, to subscribe to a service, to join a teleconference, or to join a network, as illustrative examples. In connection with the operation, the third device 186 may provide to the first device 102 a third public key 162. The third device 186 may also indicate that third identification information 164 is associated with the third public key 162. If the third user of the third device 186 is unknown to the first user of the first device 102, the first device 102 may communicate with the server 190 to authenticate the third device 186.

To illustrate, the first device 102 may transmit to the server 190 (e.g., using the communication interface 130) a request 172 for authentication associated with the third identification information 164. In some examples, the request 172 indicates the third public key 162. Further, in some examples, the request 172 may include one or more of the first public key 106 or another identifier associated with the first device 102. For example, the request 172 may include a nonce (or other value) signed by the first device 102 using the first private key 108, which may enable the server 190 to authenticate the request 172 as being transmitted by the first device 102.

The server 190 may access the database 192 based on the request 172. For example, the server 190 may access the signed certificates 194 to determine whether the database 192 includes a sequence 196 of signed certificates from the first public key 106 to the third public key 162. In some implementations, the server 190 may use a shortest-path identification process (e.g., a Dijkstra process or another process) to identify the sequence 196. The sequence 196 may indicate that, among the signed certificates 194, the first device 102 has signed a certificate of another device, and the other device has signed a certificate of the third device 186. To illustrate, in some examples, the other device may correspond to the second device 182. In such examples, the sequence 196 may include the first public key 106, to the second public key 152, to the third public key 162. Other examples are also within the scope of the disclosure.

Based on the request 172, the server 190 may transmit to the first device 102 a response 174 that indicates whether the server 190 identifies, within the database 192, the sequence 196. For example, based on identifying the sequence 196, the server 190 may transmit to the first device 102 a response 174 that includes each certificate in the sequence 196. As another example, based on a failure of the server 190 to identify the sequence 196, the response 174 may indicate the failure to identify the sequence 196 (such as by including a status bit or other message having one or more values specifying the failure to identify the sequence 196).

In some examples, if the response 174 indicates failure to identify the sequence 196, the first device 102 may indicate that the third device 186 is unauthenticated. For example, the application 122 may cause the first device 102 to generate a message (e.g., via the display 138) indicating that the third device 186 is unauthenticated.

In some other examples, the response 174 may indicate the sequence 196, and the first device 102 may perform a verification of the sequence 196. To illustrate, performing the verification of the sequence 196 may include verifying, using public keys associated with the sequence 196 (where each of the public keys is included in a respective certificate of the sequence 196), that each certificate in the sequence 196 is digitally signed by the first private key 108 of the first device 102 or by a private key that is associated with the preceding certificate in the sequence 196. Further, the first device 102 may initiate a display (e.g., via the display 138) of an indication of a result 146 of the verification of the sequence 196, which may indicate success or failure of the first device 102 to verify that each certificate in the sequence 196 is digitally signed by the first private key 108 of the first device 102 or by a private key that is associated with the preceding certificate in the sequence 196.

Alternatively or in addition, the first device 102 may perform a verification that the third device 186 holds the third private key 188 (which corresponds to the third public key 162). For example, the first device 102 may provide the third device 186 a message 166 to the third device 186 (e.g., by transmitting the message 166 via the communication interface 130 or by displaying a code representing the message 166 via the display 138). In some examples, the message 166 includes one or more values, such as a nonce or a reference value. The third device 186 may sign the one or more values using the third private key 188 to generate a signed version 168 of the message 166. The first device 102 may receive the signed version 168 from the third device 186 (e.g., via the communication interface 130 or via the image sensor 134) and may attempt to decrypt the signed version 168 using the third public key 162. Further, the first device 102 may initiate a display (e.g., via the display 138) of an indication of a result (e.g., the result 146 or another message) of the verification that the third device 186 holds the third private key 188. To further illustrate, if the first device 102 decrypts the signed version 168 using the third public key 162, the result may indicate that the third device 186 holds the third private key 188, and if the first device 102 fails to decrypt the signed version 168 using the third public key 162, the result may indicate that the third device 186 does not (or may not) hold the third private key 188.

In some implementations, the first device 102 may transmit one or more messages based on verification of (or failure to verify) the third identification information 164 associated with the third device 186. For example, based on success of the verification of the third identification information 164 associated with the third device 186, the first device 102 may transmit to the third device 186 a message indicating the success of the verification. As another example, based on failure to verify the third identification information 164 associated with the third device 186, the first device 102 may transmit to the third device 186 a message indicating the failure.

In some examples, the first device 102 may initiate one or more operations based on successfully verifying the third identification information 164 associated with the third device 186. For example, the first device 102 may initiate or perform a transfer of data or a file to the third device 186 based on successfully verifying the third identification information 164 associated with the third device 186, such as in connection with a download of data or a file. As another example, based on successfully verifying the third identification information 164 associated with the third device 186, the first device 102 may enable the third device 186 to access a computer system, to subscribe to a service, to join a teleconference, or to join a network, as illustrative examples. Other examples are also within the scope of the disclosure.

To further illustrate, in some examples, the third device 186 may provide the third public key 162 and the third identification information 164 to the first device 102 in connection with a request to join a teleconference, such as a video or audio teleconference that may be conducted over the Internet (e.g., where the first device 102 corresponds to a host of the teleconference). In some cases, a malicious user may attempt to "spoof" the identity of another user (such as by spoofing the name, Internet Protocol (IP) address, or phone number of the other user) in order to gain access to the teleconference. By verifying the third identification information 164 using the sequence 196, the first device 102 may avoid allowing the third device 186 to access the teleconference in cases in which the third device 186 is spoofing the third identification information 164 (e.g., instead of relying on the third identification information 164 to determine whether to allow the third device 186 to access the teleconference).

In some examples, one or more reliability metrics may be used in connection with the sequence 196 to determine a reliability of verification of the third identification information 164. The one or more reliability metrics may enable a spectrum of verification (e.g., from a high likelihood of verification to a lower likelihood of verification) associated with the sequence 196. To illustrate, as described further with reference to FIG. 2, the server may determine one or more reliability metrics 198, and the first device 102 may determine a particular reliability metric 148. Certain examples that may be associated with the particular reliability metric 148, the one or more reliability metrics 198, and other illustrative aspects are described further with reference to FIG. 2.

Figure 2:
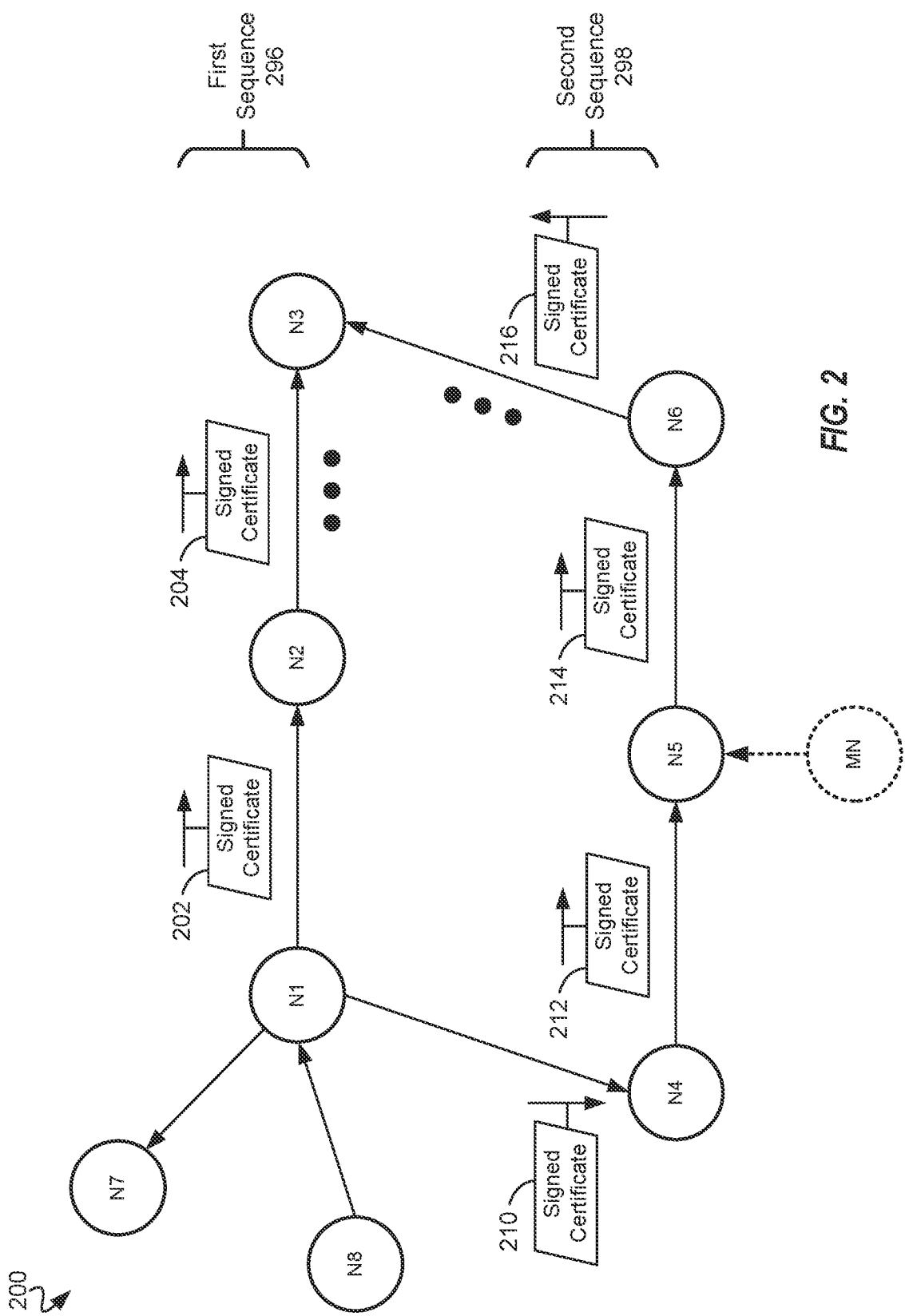
FIG. 2 is a diagram of an illustrative example of a graph that may represent information stored by a database of a server according to some aspects of the disclosure.

FIG. 2 is a diagram of an illustrative example of a graph 200 that may represent information stored by the database 192 of the server 190 according to some aspects of the disclosure. The graph 200 may include or may represent a plurality of nodes, such as nodes N1, N2, N3, N4, N5, N6, N7, and N8 (collectively referred to as N1-N8). Each node of the graph 200 may represent a device, user, or other party. To illustrate, in an illustrative example, the node N1 may represent the first device 102, the node N2 may represent the second device 182, and the node N3 may represent the third device 186.

In some examples, the graph 200 may represent certificates stored at the database 192. For example, each connection (or arrow) between nodes may represent a signed certificate that is included in the signed certificates 194. For example, the connection from the node N1 to the node N2 may indicate that the node N1 has signed a certificate of the node N2, resulting in a signed certificate 202. In some examples, the signed certificate 202 may correspond to the signed certificate 156 of FIG. 1. A connection from the node N2 to the node N3 may indicate that the node N2 has signed a certificate of the node N3, resulting in a signed certificate 204. Similarly, connections between the nodes N1, N4, N5, N6 and N3 may be associated with signed certificates 210, 212, 214, and 216, as illustrated. Accordingly, the signed certificates 194 of FIG. 1 may include any of the signed certificates 202, 204, 210, 212, 214, and 216.

It is noted that the example of the graph 200 is illustrative and that other examples of the graph 200 are also within the scope of the disclosure. For example, other examples of the graph 200 may include one or more of a different number of nodes, a different number of connections, or different directions of connections as compared to the example of the graph 200 illustrated in FIG. 2.

The signed certificates 202, 204 may correspond to a first sequence 296 (e.g., the sequence 196 of FIG. 1). The first sequence 296 may represent or may correspond to a first path within the graph 200. For example, the first path may extend from the node N1 to the node N2 and from the node N2 to the node N3.

In some cases, the graph 200 may indicate multiple paths between two nodes. For example, in addition to first path corresponding to the first sequence 296, the graph 200 may indicate a second sequence 298. The second sequence 298 may correspond to a second path between the nodes N1 and N3 that is different than the first path corresponding to the first sequence 296. For example, the second path may extend from the node N1 to the node N4, from the node N4 to the node N5, from the node N5 to the node N6, and from the node N6 to the node N3.

In some examples, the sequence 196 of the response 174 of FIG. 1 may correspond to a shortest path identified by the server 190 from the node N1 to the node N3. In such examples, the sequence 196 may correspond to the first sequence 296, which includes fewer connections (two connections) than the second sequence 298 (four connections), and the first path may correspond to a shortest path from the node N1 to the node N3. In some implementations, use of the shortest path may simplify one or more operations performed by one or more devices (such as the server 190 and the first device 102). For example, use of a shortest-path identification process (e.g., a Dijkstra process or another process) by the server 190 to find the shortest path may be less computationally complex than some other path identification processes, which may reduce latency associated with the response 174 in some cases. As another example, use of the shortest path may result in fewer verification operations performed by the first device 102, which may reduce power consumption of the first device 102 or latency associated with generating the result 146 in some cases.

In some other examples, the response 174 may indicate multiple sequences between nodes. For example, the response 174 may indicate both the first sequence 296 and the second sequence 298.

In some implementations, the server 190 may determine the one or more reliability metrics 198 based on each sequence identified by the server in response to the request 172. For example, the one or more reliability metrics 198 may include a first reliability metric associated with the first sequence 296 and may further include a second reliability metric associated with the second sequence 298. To further illustrate, the one or more reliability metrics 198 may include, for each sequence, a reliability metric that is based on one or more of a number of reliable connections associated with the sequence, an occurrence of a malicious node associated with the sequence (e.g., where the malicious node is directly connected to a node included in the sequence), or a distance from a malicious node (e.g., where the malicious node is indirectly connected to a node included in the sequence). As an illustrative example, the first sequence 296 may be more reliable than the second sequence 298 due to a malicious node (node MN) being connected to the node N5 of the second sequence 298. The response 174 may indicate the one or more reliability metrics 198.

In some implementations, the first device 102 may determine a particular reliability metric 148 of FIG. 1 based on the response 174. To illustrate, the first device 102 may determine the particular reliability metric 148 based on a cardinality of the multiple sequences (e.g., a cardinality of two), since for example greater number of sequences may indicate a greater level of reliability (or a reduced likelihood of malicious actor). Alternatively or in addition, the first device 102 may determine the particular reliability metric 148 based on the one or more reliability metrics 198 determined by the server 190. In some examples, the first device 102 may initiate display of the particular reliability metric 148 (or information associated with the particular reliability metric 148), such as in connection with the result 146.

In some aspects, the server 190 may add or remove nodes and connections indicated by the graph 200, such as by adding a node for an additional device that downloads or uses the application 122, by adding a connection between nodes to represent a certificate signature, or both. Further, in some examples, the server 190 may remove one or more of a node or a connection based on malicious activity (or suspected malicious activity). As an example, the server 190 may identify a malicious node (such as the node MN) that is associated with a malicious device, person, or other party (such as a device that is offering incorrect identification information). In such examples, the server 190 may perform one or more remedial operations, such as by adding an indication of the device to a list of malicious devices, or by removing connections associated with the node MN from the graph 200. To further illustrate, the server 190 may remove a connection between the node MN and the node N5 from the graph 200.

Further, in some implementations, a wallet associated with the application 122 may be associated with a reliability metric that is based on one or more of a number of connections associated with the wallet, a first number of occurrences of malicious nodes associated with the wallet, or a second number of connections separating the wallet from a malicious node. To illustrate, the wallet 124 of the first device 102 may be associated with a reliability metric that is one or more of a number of connections associated with the wallet (e.g., four connections), a first number of occurrences of malicious nodes associated with the wallet 124 (which may be zero in the example of FIG. 2), or a second number of connections separating the wallet 124 from a malicious node (e.g., three connections).

To further illustrate some aspects of the disclosure, in some examples, users may sign each other's certificates, asserting that the personal information (such as name, phone number, address, social media handle, etc.) associated with said key is correct. As these signatures are shared with a central repository (e.g., the database 192), a network may be formed linking signers to signees. The network may enable a first user to verify (e.g., via public key cryptography) the identity of another user based on a connection existing between the two users (e.g., a connection illustrated within the graph 200 of FIG. 2). The network may include the system 100 of FIG. 1.

In some examples, one or more operations described herein may be performed using personal Internet-connected devices (such as a cell phone), which each may include or may be referred to as a "wallet" (such as the wallet 124). A "share" (e.g., a certificate) may contain a public key and other personal information. For example, the unsigned certificate 150 may correspond to a share that includes the second public key 152 and the second identification information 154. In some examples, one or more features of a share may correspond to one or more features of an X.509 certificate. The system may include a central repository of shares, such as the database 192 of the server 190. Personal Internet-connected devices may include an application program interface (API) (which may be associated with or included in the application 122). The API may update and query the central repository.

A wallet may initiate, control, or perform operations, such as creating or managing a share and storing contacts associated with the share. Based on creation of a new share (such as by downloading the application 122), information associated with the share may be sent to the API and stored in the central repository. Further, based on a wallet signing a share of a contact, information associated with the share may be transmitted to the central repository. The API may be queried to identify paths between shares (e.g., to identify one or more of the sequence 196, the first sequence 296, or the second sequence 298).

As the number of shares in a network increases, the probability of a path between two given nodes representing two devices, persons, or parties may increase. For example, as the number of nodes and connections of the graph 200 increases, any two nodes of the graph 200 may be, on average, separated by no more than the particular number of connections (such as an average of six connections). With access to a central repository containing a store of signatures (which indicate relationships associated with the signatures), the API may perform a process (such as a Dijkstra process or another process) to identify the shortest path between two nodes (which may represent devices, persons, or other parties). When the API is queried, the API may return a chain of signatures, such as one or more of the sequence 196, the first sequence 296, or the second sequence 298. In some examples, since each wallet may store the public keys of all connections associated with the wallet (i.e., each share signed by the wallet), an initial connection (e.g., the direct contact of the person making the query) in the returned chain may act as the "root certificate" and successive connections can in turn be verified.

A graph may be generated or may be used to represent links from each share to contacts of the share. For example, the graph may correspond to the graph 200 of FIG. 2.

The API for interacting with the graph may include operations such as an addWallet operation, an addSignature operation, and a getPath operation. In some examples, the operations may be initiated, performed, or controlled by the application 122. The addWallet operation may be performed to add a share to the graph. The addSignature operation may be performed to add a signed share to the graph leading from the signer to the signee. The getPath operation may return a chain of certificates between two shares (e.g., by connecting two points on the graph), such as by initiating the request 172 to the server 190 and receiving the response 174.

In some implementations, a waitForVerification web-socket endpoint may be used in connection with one or more features described herein. To illustrate, a first device, person, or party (e.g., a website operator or store owner) requesting verification from a second device, person, or party (e.g., a customer) may provide, to the second device, person, or party, a nonce (which may be in the form of a QR code) and a share of the first device, person, or party. In some examples, the website operator or store owner may correspond to or may be associated with the first device 102, and the customer may correspond to or may be associated with the second device 182. The share may include the first public key 106 and may further include the first identification information 110. The nonce may be included in or may correspond to the message 166. The website operator or store owner may also open a waitForVerification websocket and may provide the nonce in a message to the API. The customer may receive the nonce (such as by scanning the QR code,) and may sign the nonce (e.g., to generate the signed version 168). The customer may send the signed nonce or signature to the getPath function with a share of the customer and a share of the website operator or store owner. Based on receiving the nonce, the getPath function may redirect a response to the open websocket of the web site owner.

In some implementations, a wallet may operate as a proxy or extension of the wallet of a device, person, or other party. The proxy wallet may be associated with another wallet, such as a local wallet. In some implementations a proxy wallet may go through a one-time configuration process. In an example of a one-time configuration process, the proxy wallet may register itself with the API as a new proxy wallet. The proxy wallet may then use a waitForVerification web-socket endpoint to ask the owner to sign a nonce. The owner of the proxy wallet may sign the nonce and send the signed nonce to the server indicating that the originator of the nonce (i.e. the proxy wallet) is an authorized proxy of the owner. The server may respond to the waitForVerification web-socket with the signed nonce and the owner's public key. The proxy wallet may check that the signed nonce can be decrypted using the owner's public key and may save the owner's public key for future use. If a third device attempts to verify itself to the proxy wallet, the server may search for a path between the owner and the third device. If the proxy wallet receives the certificate path from the server, it may use the owner's public key to verify the signature of the first certificate in the chain. By using the proxy wallet, a web site owner may avoid the need to export their private key from its original device. The website owner may use the app (e.g., the application 122) securely on their phone or other device and may have a "read only" extension of the local wallet on the server.

In some aspects, each share associated with the application 122 may be hashed using a particular hashing scheme. To illustrate, the particular hashing scheme may use a Merkle tree data structure that may represent individual pieces of the identity information. When new contacts sign the share they may sign the root of the merkle tree data structure. In some such examples, when providing the Share to prove an identity, some (but not all) portions of a Merkle tree data structure may be made available (e.g., for privacy).

An app (such as the application 122) may be used to store the share of a user and the contact list of the user (such as the contact list 128). The app may perform operations, such as registration as a new wallet, signing certificates, initiating verification requests, and sending information to the API. The app may manage the contact list and may operate as a keychain for storing public keys of contacts indicated by the contact list 128.

In some examples, signature revocation may be performed by removing a signature from the graph, such as by removing a signature associated with the malicious node MN from the graph 200. After performing signature revocation of a signature, the signature will not be used to create a path of signatures.

In some implementations, data analytics may be performed on the server based on a graph (such as the graph 200). For example, natural cluster growth may be analyzed and anomalies may be searched for or identified. An anomaly may indicate a bad actor is attempting to create an unreliable network. Path reliability metrics can be enhanced with the addition of notary signatures. In some implementations, one or more features of a notary signature may correspond to one or more features of an extended validation secure socket layer (SSL) certificate. Multiple paths between two connections may indicate a more reliable "path." Fraud reporting may enable users of the application 122 to report a path that turned out to be unreliable or associated with a malicious actor.

Wallet scoring may be performed to determine a reliability score for a particular wallet. For example, wallet scoring may be performed based on one or more of a number of reliable connections associated with the wallet, occurrence of a malicious node associated with the wallet (e.g., where the malicious node is directly connected to a node representing the wallet), or distance from a malicious node (e.g., where the malicious node is indirectly connected to a node representing the wallet). By using wallet scoring, the reliability of a path may be provided (e.g., in the response 174) along with the path.

Accordingly, to further illustrate, a user may generate a share that includes a public key of the user and personal information associated with the user. The user may register the share with the addWallet API. Upon meeting another user (e.g., a friend) in person or over a trusted medium, the users may exchange shares. Each share may include the public key and personal information of the respective user. Each user may review the personal information of the other user to confirm that the personal information is correct. After confirming the personal information, each user may sign the share of the other user (using the private key of the user) to generate a signed share (e.g., the signed certificate 156) and may send the signed share to the addSignature API.

To verify the identity of a user (e.g., a potential customer), the user may provide a share of the user to another party (e.g., to a website owner). The website owner may query the API using the public key of the website owner and the public key of the potential customer as an input to the API (e.g., to generate the request 172). A chain of signatures between the website owner and the potential customer may be returned (e.g., via the response 174). The website owner may verify the chain of signatures (e.g., using an SSL certificate chain verification technique) starting with the first link in the chain, which may be a contact having a public key they stored on the device of the website owner (e.g., in the wallet 124). After (or before) the chain is verified, the website owner may request the potential customer to sign a nonce, indicating that the potential customer is the owner of the supplied public key. By verifying the chain and confirming that the potential customer has the corresponding private key, the website owner may determine that the identity of the user is authenticated.

In some examples, one or more features described herein may be built into a device or modified to be used based on one or more criteria. To illustrate, one or more features of the application 122 (such as the contact list 128) may be an extension to a native contacts app that is "built into" a device (e.g., via the operating system 118). Upon adding a new contact, a new connection may be automatically registered with the API. Alternatively or in addition, the application 122 may be included in Internet-of-Things (IoT) devices (e.g., for enhanced security).

One or more features described herein may improve accuracy, reliability, or efficiency associated with information verification. For example, the first device 102 may independently verify the third device 186 using public keys of the sequence 196. As a result, reliance on a third party to assess ancillary markers may be reduced or avoided, resulting in a "trustless" (or reduced trust) verification system (e.g., where the first device 102 may cryptographically verify the sequence of signed certificates instead of relying on a third party service to assess ancillary markers associated with the third device 186). Further, in some cases, the verification system may reduce or avoid third party access to personal or confidential information. In addition, in some cases, the verification system may improve verification accuracy as compared to some third party services (such as in cases where some markers indicate legitimacy and other markers indicate illegitimacy) and may reduce cost and latency (e.g., by avoiding parsing of emails to identify ancillary markers). Further, in some implementations, use of a hashed data structure (such as a Merkle tree data structure) may increase security and privacy by reducing an amount of personal information transmitted and stored within a system.

Figure 3:
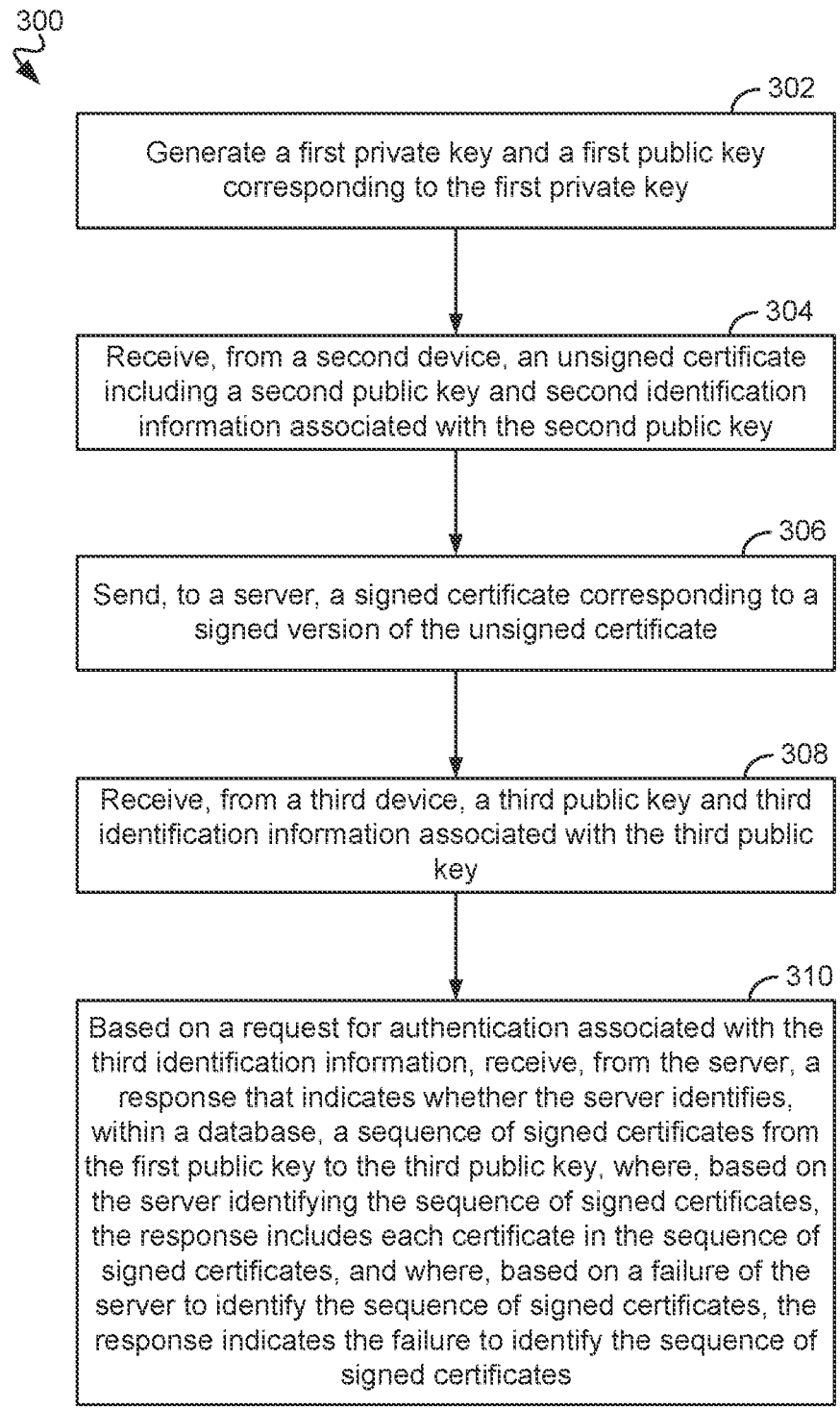
FIG. 3 is a flow chart of an example of a method of operation of a device according to some aspects of the disclosure.

FIG. 3 is a flow chart of an example of a method of operation of a device according to some aspects of the disclosure. For example, the method 300 may be performed by the first device 102.

The method 300 may include generating a first private key and a first public key corresponding to the first private key, at 302. For example, the first device 102 may perform a key generating process to obtain (e.g., generate) the first public key 106 and the first private key 108.

The method 300 further includes receiving, from a second device, an unsigned certificate including a second public key and second identification information associated with the second public key, at 304. For example, the first device 102 may receive the unsigned certificate 150 from the second device 182, and the unsigned certificate 150 may include the second public key 152 and the second identification information 154.

The method 300 further includes sending to a server a signed certificate corresponding to a signed version of the unsigned certificate, at 306. For example, the first device 102 may send the signed certificate 156 to the server 190 corresponding to a signed version of the unsigned certificate 150.

The method 300 further includes receiving, from a third device, a third public key and third identification information associated with the third public key, at 308. For example, the first device 102 may receive the third public key 162 and the third identification information 164 from the third device 186.

The method 300 further includes, based on a request for authentication associated with the third identification information, receiving, from the server, a response that indicates whether the server identifies, within a database, a sequence of signed certificates from the first public key to the third public key, at 310. For example, based on the request 172, the first device 102 may receive the response 174 from the server 190. The response 174 may indicate whether the server 190 identifies, within the database 192, a sequence of signed certificates from the first public key 106 to the third public key 162. The sequence may correspond to the sequence 196, the first sequence 296, the second sequence 298, or another sequence.

Based on the server identifying the sequence of signed certificates, the response includes each certificate in the sequence of signed certificates. For example, based on the server identifying the sequence 196, the response 174 may include each certificate in the sequence 196.

Based on a failure of the server to identify the sequence of signed certificates, the response indicates the failure to identify the sequence of signed certificates. For example, based on failure of the server 190 to identify a sequence from the first public key 106 to the third public key 162, the response 174 may indicate the failure.

In some examples, one or more of data, signals, messages, or information described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include one or more processors, electronics devices, hardware devices, electronics components, logical circuits, memories, software, firmware, among other examples, or any combination thereof. Software may include instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features described herein may be implemented via specialized processor circuitry, via executable instructions, or combinations thereof.

To further illustrate, various illustrative components, blocks, modules, circuits, and operations have been described above generally in terms of their functionality. Whether such functionality is implemented as hardware or software depends upon the particular application and design of the overall system. Skilled artisans may implement the described functionality in varying ways for each particular application, but such implementation decisions should not be interpreted as causing a departure from the scope of the present disclosure. Skilled artisans will also recognize that the order or combination of components, methods, or interactions that are described herein are merely examples and that the components, methods, or interactions of the various aspects of the present disclosure may be combined or performed in ways other than those illustrated and described herein.

A processor (such as the processor 104) used to implement one or more features described herein may be implemented or performed with a general purpose single-chip or multi-chip processor, a central processing unit (CPU), a digital signal processor (DSP), an application specific integrated circuit (ASIC), a field programmable gate array (FPGA) or other programmable logic device, discrete gate or transistor logic, discrete hardware components, or any combination thereof. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, one or more operations described herein may be implemented in hardware, digital electronic circuitry, computer software, firmware, including one or more structures disclosed in this specification and their structural equivalents thereof, or in any combination thereof. Implementations of the subject matter described in this specification also may be implemented as one or more computer programs, such as one or more modules of computer program instructions, encoded on a computer storage media for execution by, or to control the operation of, a data processing apparatus.

If implemented in software, the functions may be stored on or transmitted over as one or more instructions or code on a computer-readable medium. The processes of a method or process disclosed herein may be implemented in a processor-executable software module, which may reside on a computer-readable medium. Computer-readable media includes computer storage media. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine-readable medium and computer-readable medium, which may be incorporated into a computer program product.

Certain features described herein in the context of separate implementations also may be implemented in combination in a single implementation. Further, one or more features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art.

The description herein is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples described herein but is to be accorded the widest scope consistent with the principles and features described herein.

What is claimed is:

1. A method of operation of a first device that stores a first private key and a first public key corresponding to the first private key, the method comprising:
    receiving, from a second device, an unsigned certificate including a second public key and second identification information associated with the second public key;
    performing a hash of a first parameter indicated by the second identification information to generate a first hash value, and a hash of a second parameter indicated by the second identification information to generate a second hash value;
    performing a hash of the first hash value and the second hash value to generate a third hash value, and generating a public key digital signature of the second public key and the third hash value;
    sending, to a server, a signed certificate corresponding to a signed version of the unsigned certificate;
    receiving, from a third device, a third public key and third identification information associated with the third public key; and
    based on a request for authentication associated with the third identification information, receiving, from the server, a response that indicates whether the server identifies, within a database, a sequence of signed certificates from the first public key to the third public key,
    wherein, based on the server identifying the sequence of signed certificates, the response includes each certificate in the sequence of signed certificates, and
    wherein, based on a failure of the server to identify the sequence of signed certificates, the response indicates the failure to identify the sequence of signed certificates.

2. The method of claim 1, further comprising performing a verification of the sequence of signed certificates, wherein performing the verification of the sequence of signed certificates includes verifying, using a plurality of public keys associated with the sequence of signed certificates, that each certificate in the sequence of signed certificates is digitally signed by the first private key or by a private key that is associated with a preceding certificate in the sequence of signed certificates.

3. The method of claim 2, further comprising initiating a display of an indication of a result of the verification of the sequence of signed certificates.

4. The method of claim 1, further comprising performing a verification that the third device holds a third private key corresponding to the third public key, wherein performing the verification includes:
    providing a message to the third device;
    receiving, from the third device, a signed version of the message; and
    decrypting the signed version of the message using the third public key.

5. The method of claim 4, further comprising initiating a display of an indication of a result of the verification that the third device holds the third private key.

6. The method of claim 1, wherein the sequence corresponds to a first path, within a graph representing certificates stored at the database, between nodes representing the first device and the third device.

7. The method of claim 6, wherein the first path corresponds to a shortest path between the nodes within the graph.

8. The method of claim 6, wherein the response further indicates multiple sequences including the sequence and a second sequence corresponding to a second path between the nodes different than the first path.

9. A device comprising:
    a memory configured to store a first private key and a first public key corresponding to the first private key; and
    one or more processors coupled to the memory and configured to:
        receive, from a second device, an unsigned certificate including a second public key and second identification information associated with the second public key;
        perform a hash of a first parameter indicated by the second identification information to generate a first hash value, and a hash of a second parameter indicated by the second identification information to generate a second hash value;
        perform a hash of the first hash value and the second hash value to generate a third hash value, and generate a public key digital signature of the second public key and the third hash value;
        send, to a server, a signed certificate corresponding to a signed version of the unsigned certificate;
        receive, from a third device, a third public key and third identification information associated with the third public key; and
        based on a request for authentication associated with the third identification information, receive, from the server, a response that indicates whether the server identifies, within a database, a sequence of signed certificates from the first public key to the third public key,
        wherein, based on the server identifying the sequence of signed certificates, the response includes each certificate in the sequence of signed certificates, and
        wherein, based on a failure of the server to identify the sequence of signed certificates, the response indicates the failure to identify the sequence of signed certificates.

10. The device of claim 9, wherein the one or more processors are further configured to store either the second public key and the second identification information, or an indication of the second public key and an indication of the second identification information, to a wallet associated with the device.

11. The device of claim 10, wherein the wallet is stored locally at the device.

12. The device of claim 10, wherein the wallet corresponds to a proxy wallet that is stored remotely to the device and that corresponds to a read-only extension of a local wallet stored at the device.

13. The device of claim 9, wherein the one or more processors are further configured to:
    determine, based on one or more of a cardinality of multiple sequences or one or more reliability metrics indicated by the response, a particular reliability metric associated with the authentication; and initiate display of an indication of the particular reliability metric.

14. The device of claim 9, further comprising an image sensor configured to capture an image of one or more codes displayed by the second device, the one or more codes representing the unsigned certificate.

15. A computer-readable medium storing instructions executable by a processor of a first device, the first device storing a first private key and a first public key corresponding to the first private key, the instructions executable by the processor to initiate, perform, or control operations comprising:

receiving, from a second device, an unsigned certificate including a second public key and second identification information associated with the second public key;

performing a hash of a first parameter indicated by the second identification information to generate a first hash value, and a hash of a second parameter indicated by the second identification information to generate a second hash value;

performing a hash of the first hash value and the second hash value to generate a third hash value, and generating a public key digital signature of the second public key and the third hash value;

sending, to a server, a signed certificate corresponding to a signed version of the unsigned certificate;

receiving, from a third device, a third public key and third identification information associated with the third public key; and based on a request for authentication associated with the third identification information, receiving, from the server, a response that indicates whether the server identifies, within a database, a sequence of signed certificates from the first public key to the third public key, wherein, based on the server identifying the sequence of signed certificates, the response includes each certificate in the sequence of signed certificates, and wherein, based on a failure of the server to identify the sequence of signed certificates, the response indicates the failure to identify the sequence of signed certificates.

16. The computer-readable medium of claim 15, wherein the operations further include performing a verification of the sequence of signed certificates, and wherein performing the verification of the sequence of signed certificates includes verifying, using a plurality of public keys associated with the sequence of signed certificates, that each certificate in the sequence of signed certificates is digitally signed by the first private key or by a private key that is associated with a preceding certificate in the sequence of signed certificates.

17. The computer-readable medium of claim 16, wherein the operations further include initiating a display of an indication of a result of the verification of the sequence of signed certificates.

18. The computer-readable medium of claim 15, wherein the operations further include performing a verification that the third device holds a third private key corresponding to the third public key, and wherein performing the verification includes:

providing a message to the third device;

receiving, from the third device, a signed version of the message; and decrypting the signed version of the message using the third public key.

19. The computer-readable medium of claim 18, wherein the operations further include initiating display of an indication of a result of the verification that the third device holds the third private key.

* * * * *